Figure 1:
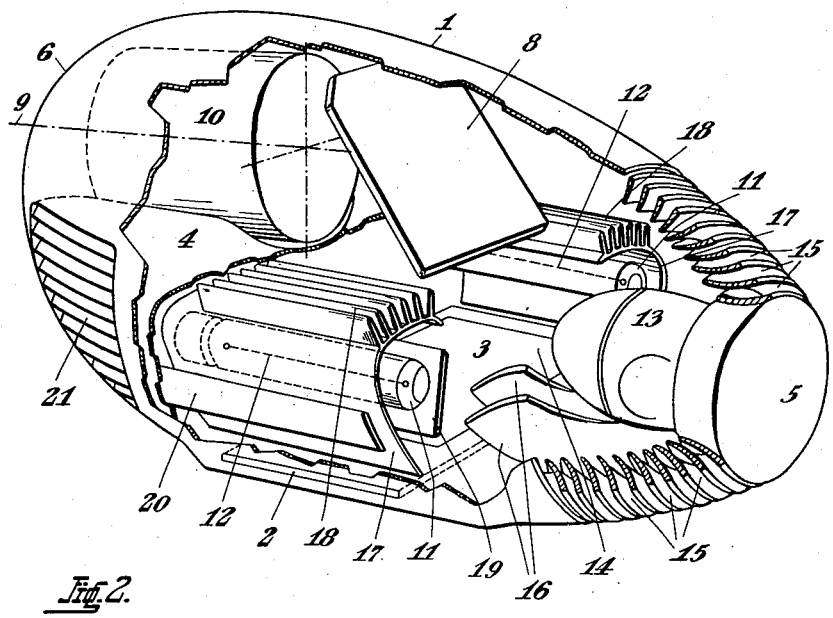

Oct. 9, 1951  G. ANDREOLI  2,570,507

EPISCOPIC PROJECTOR

Filed Oct. 19, 1949

GIANNI ANDREOLI
INVENTOR
By Richardson, David and Nydow
his ATT'YS.

Patented Oct. 9, 1951

2,570,507

UNITED STATES PATENT OFFICE 2,570,507

EPISCOPIC PROJECTOR

Gianni Andreoli, Emmen, Switzerland

Application October 19, 1949, Serial No. 122,173
In Switzerland March 22, 1949

3 Claims. (Cl. 88—24)

The object of the present invention is an episcope for projecting images, such as photographs, pictures and the like having an inner apparatus enclosed within a housing and comprising a blower and at least one air duct, the image to be projected by said episcope being inserted in the air duct below a free opening of the duct, through which opening the light rays reflected from the image and forming the projection cone are projected on to a reversing mirror arranged in the housing, said mirror projecting the light rays through and out of an objective arranged in the housing, the cooling air forced between the inlet baffle plates serving as a light lock flowing through the air duct and between air guiding plates arranged in the duct in a forced air stream created by said blower in order to sweep over the image itself and its illumination system and to flow through outlet baffle plates serving as a light lock.

By way of example an embodiment of the object of the present invention is shown in the drawing in which:

Fig. 1 is a perspective, diagrammatic view and section of the episcope and

Figure 2:
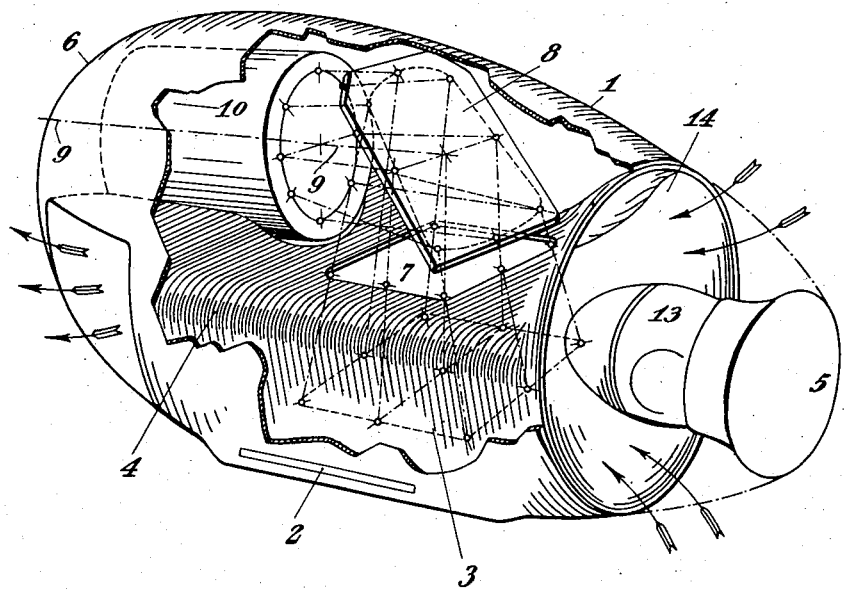

Fig. 2 a perspective section through the illuminating system thereof.

The episcope has an outer housing 1 in which a slot 2 is arranged at the bottom essentially in the centre into which slot the image 3 to be projected is inserted at the bottom of the air duct 4. Above the image the air duct 4 running from the rear end 5 of the housing 1 to the front end 6 is arranged. In the top wall of said air duct an opening 7 is cut out and above said opening the reversing mirror 8 is arranged at an angle of 45° to the axis of projection 9. By the mirror 8 the light rays coming from the image 3 are reflected into the objective 10 and are projected from there on to a surface outside the episcope. For illuminating the image two essentially cylindrical tubular lamps 11 are arranged on two parallel sides of said image above same in the air duct 4. These tubular lamps have their axes arranged parallel to each other and have filaments 12, thus ensuring a uniform light strength across the whole area of the image. The tubular lamps 11 develop great heat whereby the photographs and the paper of the images are subjected to the danger of being burnt if these quantities of heat are not continuously led away. This purpose is served by the air duct 4 which is in connection with a fan or blower 13 arranged at the end opposite the objective 10. This blower 13 opens into a hollow space 14 of the duct into which the air fed and drawn flows from without through the slots 15 and is heated by the air baffle plates 16, the image and the lamps 11 and their reflectors 17 and cooling fins 18 respectively and the filter plates 19 and heat conducting plates 20 and, flowing further towards the end of the objective, is forced out of the housing of the episcope through slot-shaped outlet openings 21.

At its rear end the housing is provided with inlet baffle plates acting as a light lock and forming annular openings on the whole circumference of the housing and has slot-shaped openings arranged transversally in the lower part of the front end formed by outlet baffle plates serving as a light lock. These openings assist the air circulation and form the beginning and the end of the air duct. The housing itself is formed rotary-symmetrically at its front and rear end and has a flattened portion in the centre of its bottom.

The axis of the projection cone of the light rays is arranged at an angle of practically 90° to the longitudinal axis of the duct and said two axes lie in the same plane as the projection axis of the objective.

The supply line terminals for the electric motor of the blower and for the incandescent lamps as well as their switching elements are not shown in the drawing.

The air flow through the air duct can either take place by means of pressure as is shown in the example or also inversely by air suction. With expedience an air screw driven by an electric motor can be used, the air screw being arranged in the duct in a widened portion thereof, and the free cross section of the duct having a rotary-symmetrical shape in the plane of the air screw. The cross sections of the duct can be carried out in such a manner that they increase in the direction of the air flow. Furthermore heat conducting plates can be inserted in the circulation duct arranged parallel to the direction of the air flow. The heat conducting plates can be connected metallically with the gate of the image for the purpose of cooling, and the gate of the image itself can consist of metal. For the purpose of efficient cooling the air can be made to flow above as well as below the image. In the bottom of the housing an opening can be provided for the direct projection of images having larger dimensions than those of the slot 2 in the housing.

What I claim is:

1. An episcope for projecting images such as photographs, pictures and the like comprising a housing, a blower enclosed within the housing, and at least one air duct, means whereby the image to be projected by said episcope is inserted in the air duct, said duct having a free opening below which the image is inserted and, through which opening the light rays are reflected from the image, a reversing mirror in the housing, upon which said light rays are projected, as a cone, an objective in the housing, through and/out of which said rays are projected, an illumination system with two illuminating lamps being arranged at two opposite sides of the image opening, reflectors enclosing said lamps on three sides so as to reflect the light rays on the image through the cooling current of air, the blower being disposed behind the image opening at the axis of the apparatus and blowing fresh air from behind the apparatus over the image, and an outlet of the housing situated below the objective for cooling the interior of the apparatus.

2. An episcope according to claim 1, the illuminating lamps for the image having a cylindrical tubular shape, being arranged along two side walls of the duct opposite to each other and having their filaments disposed parallel to the sides of the openings and the image, said lamps being enclosed on the three outer sides by the reflector, said reflector having outwardly cooling ribs, and also including filter panes placed between the air duct and the lamps, to absorb the heat radiated by the lamps, the reflectors of the lamps having parabolic cylindrical parts, and their focal axis falling together with the filament of the lamps.

3. An episcope according to claim 2 in which the housing has slot-shaped openings disposed in the longitudinal direction in the lower part of the front end and has annular openings around the whole circumference of the rear end for the purpose of air circulation, said openings forming the beginning and the end of the air duct and being in connection with each other by said duct, the housing being further provided at the rear end with inlet baffle plates acting as a light lock, said baffle plates forming annular openings around the whole circumference of the housing, said openings being also provided with outlet baffle plates for air circulation, acting as a light lock and forming the beginning and the end of the air duct, the housing being shaped rotary-symmetrically at the front and the rear end and being flattened in the centre on the bottom side.

GIANNI ANDREOLI.

REFERENCES CITED

The following references are of record in the file of this patent:

UNITED STATES PATENTS

| Number | Name | Date |
|---|---|---|
| 961,947 | Fulgora et al. | June 21, 1910 |
| 1,399,111 | Granz | Dec. 6, 1921 |
| 1,831,762 | Blohm | Nov. 10, 1931 |
| 1,904,695 | Plies | Apr. 18, 1933 |
| 2,189,577 | Conrad | Feb. 6, 1940 |
| 2,283,268 | Kreinin | May 19, 1942 |
| 2,332,691 | Blaisdell | Oct. 26, 1943 |
| 2,395,561 | Osterberg et al. | Feb. 26, 1946 |